United States Patent
Tanaka et al.

(10) Patent No.: US 10,093,571 B2
(45) Date of Patent: *Oct. 9, 2018

(54) METHOD FOR PRODUCING GLASS SHEET AND GLASS SHEET

(71) Applicant: NIPPON SHEET GLASS COMPANY, LIMITED, Tokyo (JP)

(72) Inventors: Satoshi Tanaka, Hyogo (JP); Kiyomi Fukushima, Osaka (JP); Kazuishi Mitani, Osaka (JP); Yasuhiro Saito, Osaka (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 180 days.

This patent is subject to a terminal disclaimer.

(21) Appl. No.: 14/783,749

(22) PCT Filed: Apr. 9, 2014

(86) PCT No.: PCT/JP2014/002047
§ 371 (c)(1),
(2) Date: Oct. 9, 2015

(87) PCT Pub. No.: WO2014/167856
PCT Pub. Date: Oct. 16, 2014

(65) Prior Publication Data
US 2016/0068423 A1    Mar. 10, 2016

(30) Foreign Application Priority Data

Apr. 9, 2013   (JP) .................... 2013-080934
May 24, 2013   (JP) .................... 2013-109962
Dec. 19, 2013   (JP) .................... 2013-262281

(51) Int. Cl.
C03B 18/20   (2006.01)
C03C 23/00   (2006.01)
(Continued)

(52) U.S. Cl.
CPC .............. *C03B 18/20* (2013.01); *C03B 18/14* (2013.01); *C03C 3/087* (2013.01); *C03C 15/00* (2013.01);
(Continued)

(58) Field of Classification Search
CPC ......... C03B 18/14; C03B 18/18; C03B 18/20; C03C 15/00
See application file for complete search history.

(56) References Cited

U.S. PATENT DOCUMENTS 2,410,300 A   10/1946   Frederick et al.
5,093,196 A    3/1992   Hecq et al.
(Continued)

FOREIGN PATENT DOCUMENTS

DE   3741031    6/1988
EP   2371779   10/2011
(Continued)

OTHER PUBLICATIONS

International search report for International application No. PCT/JP2014/002047, dated Jun. 27, 2014 (3 pages).
(Continued)

*Primary Examiner* — Jason L Lazorcik
(74) *Attorney, Agent, or Firm* — Hamre, Schumann, Mueller & Larson, P.C.

(57) ABSTRACT

A method of the present invention for producing glass sheets includes the steps of: (I) forming a molten glass raw material into a glass ribbon on a molten metal; and (II) bringing an acid gas that contains a fluorine element (F)-containing acid and in which a volume ratio of water vapor to the acid (a volume of the water vapor/a volume of the acid) is 0 or more and 30 or less, into contact with a surface of the glass ribbon on the molten metal so as to subject the surface of the glass
(Continued)

ribbon to dealkalization and control a morphology of the surface in accordance with the volume ratio.

2 Claims, 10 Drawing Sheets

(51) Int. Cl.
  *C03B 18/14* (2006.01)
  *C03C 3/087* (2006.01)
  *C03C 15/00* (2006.01)
(52) U.S. Cl.
  CPC ........ *C03C 23/008* (2013.01); *C03C 2204/08* (2013.01)

(56) References Cited

U.S. PATENT DOCUMENTS

| | | | |
|---|---|---|---|
| 6,440,592 B1 | 8/2002 | Meyer et al. | |
| 6,746,615 B1* | 6/2004 | Ellis | C03C 15/00 |
| | | | 216/57 |
| 7,208,235 B2* | 4/2007 | Otani | C03C 17/22 |
| | | | 428/428 |
| 8,359,885 B2 | 1/2013 | Tanii | |
| 9,404,179 B2* | 8/2016 | Nelson | C23C 16/401 |
| 2010/0089096 A1 | 4/2010 | Tamitsuji et al. | |
| 2014/0220327 A1* | 8/2014 | Adib | C03C 17/36 |
| | | | 428/217 |
| 2014/0246084 A1* | 9/2014 | Okahata | C03C 15/00 |
| | | | 136/256 |
| 2015/0072129 A1* | 3/2015 | Okahata | C03C 15/00 |
| | | | 428/220 |
| 2015/0079347 A1* | 3/2015 | Miyasaka | C03C 3/112 |
| | | | 428/141 |
| 2015/0219801 A1* | 8/2015 | Shibuya | C03C 17/28 |
| | | | 359/601 |
| 2015/0291467 A1* | 10/2015 | Miura | C03C 3/087 |
| | | | 428/220 |
| 2016/0046519 A1* | 2/2016 | Tanaka | C03B 18/20 |
| | | | 428/220 |
| 2016/0194242 A1* | 7/2016 | Tanaka | C03C 15/00 |
| | | | 428/141 |
| 2016/0200628 A1* | 7/2016 | Shirai | C03C 3/087 |
| | | | 65/30.1 |
| 2016/0200629 A1* | 7/2016 | Ikawa | C03B 25/093 |
| | | | 65/30.1 |
| 2016/0236975 A1* | 8/2016 | Sugimoto | C03C 3/083 |
| 2016/0244357 A1* | 8/2016 | Tanaka | C03C 15/00 |
| 2016/0318794 A1* | 11/2016 | Tanaka | C03C 15/00 |
| 2017/0313618 A1* | 11/2017 | Sanderson | C03C 17/2453 |

FOREIGN PATENT DOCUMENTS

| | | |
|---|---|---|
| EP | 2698356 | 4/2012 |
| JP | 112728875 | 12/1999 |
| JP | 2002516813 | 6/2002 |
| JP | 2003221257 | 8/2003 |
| JP | 2005067974 | 3/2005 |
| JP | 2006206400 | 8/2006 |
| JP | 2008138767 | 6/2008 |
| WO | 2012141310 | 10/2012 |
| WO | 2012141311 | 10/2012 |

OTHER PUBLICATIONS

Written opinion for International application No. PCT/JP2014/002047, dated Jun. 27, 2014 (7 pages).

* cited by examiner

METHOD FOR PRODUCING GLASS SHEET AND GLASS SHEET

TECHNICAL FIELD

The present invention relates to a method for producing glass sheets and to a glass sheet produced by the production method.

BACKGROUND ART

Conventionally, glass sheets are subjected to various surface treatments for the purpose of giving the glass sheets characteristics suitable for the intended use. For example, a technique of forming a thin film having a high transmittance on a surface of a glass sheet is known as one method for obtaining a glass sheet having a high transmittance. For example, Patent Literature 1 describes a glass sheet including a thin film whose main component is silicon nitride and that contains at least one of carbon and hydrogen. In addition, Patent Literature 2 describes a glass sheet having an improved transmittance provided by a thin film having a multi-layer structure in which one of the layers is a vanadium oxide layer having tungsten and fluorine added thereto. Furthermore, Patent Literature 3 proposes that when a thin film such as a metal oxide film is formed on a surface of a glass sheet in order to obtain a glass sheet having a high transmittance, dealkalization is carried out as a pretreatment for the purpose of preventing alteration of the thin film.

As another example of a method for increasing the transmittance of a glass sheet, Patent Literature 4 proposes a method relating to a glass sheet formed by a float process, the method including removing a predetermined thickness of an outermost surface portion of the bottom side of the glass sheet so as to remove a layer containing tin cations. This method makes it possible to obtain a glass sheet that exhibits a high transmittance intrinsic to the glass composition.

Depending on the intended use, surface treatments of glass are performed not only by the above methods but also by other various methods, such as a method of obtaining glass having a dense surface structure (Patent Literature 5) and a method of obtaining a glass sheet having a high transmittance for visible light by providing a plurality of depressions in a glass surface (Patent Literature 6).

CITATION LIST

Patent Literature

{Patent Literature 1} Japanese Laid-Open Patent Publication No. 2003-221257
{Patent Literature 2} Japanese Laid-Open Patent Publication (Translation of PCT Application) No. 2002-516813
{Patent Literature 3} Japanese Laid-Open Patent Publication No. 2005-67974
{Patent Literature 4} Japanese Laid-Open Patent Publication No. 2006-206400
{Patent Literature 5} Japanese Laid-Open Patent Publication No. H11-278875
{Patent Literature 6} Japanese Laid-Open Patent Publication No. 2008-137867

SUMMARY OF INVENTION

Technical Problem

As described above, in order to obtain a glass sheet having characteristics suitable for the intended use, it is conventionally necessary to appropriately select a treatment for obtaining intended characteristics from among various surface treatment methods and, in some cases, to carry out several different treatments in combination. Therefore, every time glass sheets for different uses are to be produced, it is required that, for example, steps in the production line be changed depending on the treatment to be carried out, or an additional line other than the production line be provided. Consequently, the problems of reduction in production efficiency and increase in production cost arise. In particular, the change of the steps in the production line requires cumbersome operations such as cleaning of the equipment of the production line and change of materials to be used.

Therefore, the present invention aims to provide a simple method capable of producing a glass sheet having a surface morphology that exhibits suitable characteristics for the intended use without causing a significant reduction in production efficiency and a significant increase in production cost.

Solution to Problem

The present invention provides a method for producing glass sheets, the method including the steps of:
(I) forming a molten glass raw material into a glass ribbon on a molten metal; and
(II) bringing an acid gas that contains a fluorine element (F)-containing acid and in which a volume ratio of water vapor to the acid (a volume of the water vapor/a volume of the acid) is 0 or more and 30 or less, into contact with a surface of the glass ribbon on the molten metal so as to subject the surface of the glass ribbon to dealkalization and control a morphology of the surface in accordance with the volume ratio.

Advantageous Effects of Invention

In the production method of the present invention, an acid gas for dealkalization is blown onto a surface of the glass ribbon on the molten metal. The acid gas used at this time contains a fluorine element (F)-containing acid. The fluorine element (F)-containing acid has higher ability to erode glass than other acids, in addition to which this acid is supplied onto the very hot glass ribbon on the molten metal. Therefore, the glass surface is effectively modified. Furthermore, in this acid gas, the volume ratio of water vapor to the acid (the volume of the water vapor/the volume of the acid) is adjusted within the range of 0 to 30. The surface morphology of the treated glass is determined in accordance with the volume ratio. Therefore, a glass sheet having a desired surface morphology can be produced in a simple way, i.e., by appropriately selecting the volume ratio of water vapor to the acid in the acid gas. Thus, with the production method of the present invention, dealkalization and surface morphology control can be achieved in a single step, in addition to which no major change in the existing production line for glass sheets is required. When the production line is changed, it is only necessary that the volume ratio of water vapor to the acid in the acid gas be changed. Therefore, a glass sheet having suitable characteristics for the intended use can be produced efficiently. For these reasons, with the production method of the present invention, a glass sheet having a surface morphology that exhibits suitable characteristics for the intended use can be produced in a simple way without a significant reduction in production efficiency and a significant increase in production cost.

DESCRIPTION OF EMBODIMENTS

Hereinafter, an embodiment of the present invention will be described in detail.

Figure 1:
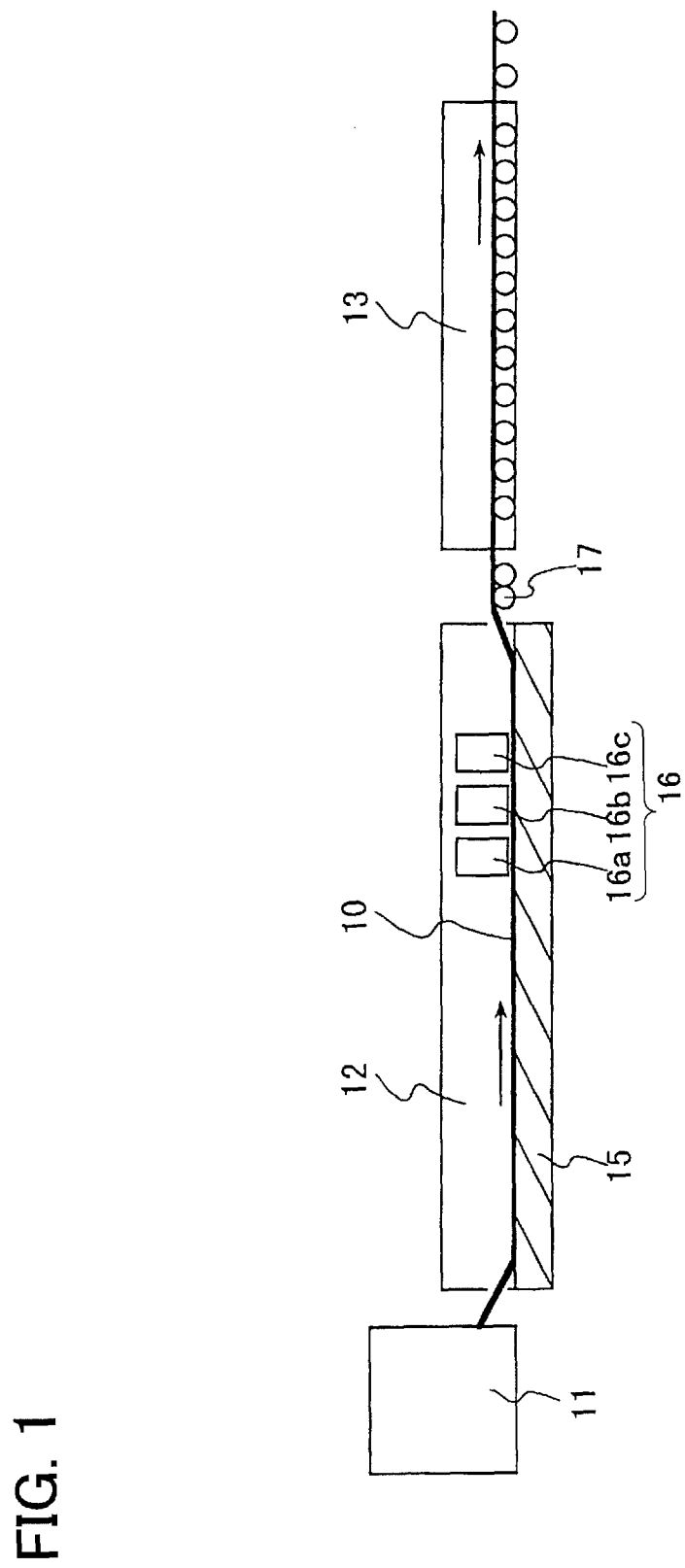
FIG. 1 is a schematic diagram showing an example of a system capable of carrying out a method of the present invention for producing glass sheets.

A method of the present embodiment for producing glass sheets includes the steps of:

(I) forming a molten glass raw material into a glass ribbon on a molten metal; and (II) bringing an acid gas that contains a fluorine element (F)-containing acid and in which a volume ratio of water vapor to the acid (a volume of the water vapor/a volume of the acid) is 0 or more and 30 or less, into contact with a surface of the glass ribbon on the molten metal so as to subject the surface of the glass ribbon to dealkalization and control a morphology of the surface in accordance with the volume ratio. This method can be carried out, for example, using a system shown in FIG. 1.

A glass raw material melted (molten glass) in a float furnace 11 flows from the float furnace 11 into a float bath 12, forms into a semisolid glass ribbon 10 while traveling on molten tin (molten metal) 15, and is then drawn out of the float bath by a roller 17 to be fed into an annealing furnace 13. The glass ribbon solidified in the annealing furnace 13 is cut into glass sheets having a predetermined size by a cutting device which is not shown.

A predetermined number of coaters 16 (three coaters 16a, 16b, and 16c in the system shown) are disposed in the float bath 12 at a predetermined distance from a surface of the high-temperature glass ribbon 10 on the molten tin 15. An acid gas for dealkalization is continuously supplied onto the glass ribbon 10 from at least one coater of the coaters 16a to 16c. Thus, a dealkalized layer from which an alkali component has been sufficiently removed is formed in the surface of the glass ribbon 10. Since the temperature of the glass ribbon 10 on the molten tin 15 is much higher than the glass-transition point, modification of the glass surface is effectively achieved. The acid gas used contains a fluorine element (F)-containing acid (desirably hydrogen fluoride). The acid gas may or may not contain water vapor. The surface morphology of the resulting glass sheet can be changed depending on the presence or absence of water vapor in the acid gas and on the amount of water vapor contained in the acid gas (the volume ratio of water vapor to the acid).

The present inventors make the following consideration on the reason why the surface morphology can be changed as described above. In the case where the acid gas is, for example, acidic water vapor containing hydrogen fluoride and water vapor, bringing such acidic water vapor into contact with a surface of the hot glass ribbon 10 causes elution of alkali ions of the glass surface, leading to formation of a dealkalized layer in the surface of the glass ribbon 10. In addition, the acidic water vapor enters the glass in various forms, such as in the form of proton ($H^+$), water ($H_2O$), and oxonium ion ($H_3O^+$), after which the water having entered the glass exits from the glass by dehydration condensation. Furthermore, since hydrogen fluoride breaks Si—O bonds that are basic structures of the glass, it is easy for water and oxonium ions to enter the glass, in addition to which phenomena such as erosion of glass by hydrogen fluoride and reprecipitation of glass occur in a complicated manner. For these and other reasons, changing the amount of water vapor in the acidic water vapor, which causes a change in the degree of progression of dehydration condensation, makes it possible for the surface of the dealkalized layer, i.e., the surface of the glass ribbon 10, to have a projection-depression pattern or a flat, smooth, and dense structure. In the present specification, the dense structure means a structure that has an increased number of siloxane bonds produced by dehydration condensation as described above.

[Surface Morphology of Glass Sheet]

As described above, the surface morphology of the resulting glass sheet varies depending on the amount of water vapor contained in the acid gas. The following will describe surface morphologies formed by changing the volume ratio of water vapor to the acid in the acid gas.

One surface morphology (first surface morphology) will be described. When no water vapor is present in the acid gas, that is, when the volume ratio of water vapor to the acid is 0, projections and depressions having a depth of 20 to 100 nm can be formed in the surface of the dealkalized layer. This can be seen as follows: although no water vapor is contained in the acid gas brought into contact with the surface of the glass sheet, water present in the glass or water generated by erosion of the surface of the glass sheet by hydrogen fluoride causes slight dehydration condensation to proceed, resulting in formation of such projections and depressions. The phrase "projections and depressions having a depth of 20 to 100 nm" means that the distance in the thickness direction of the glass sheet between the highest projection point (the projection in the dealkalized layer surface that is most protruding in the thickness direction of the glass sheet) and the deepest depression point (the depression in the dealkalized layer surface that is most depressed in the thickness direction of the glass sheet) is in the range of 20 to 100 nm. The same applies when the depth of projections and depressions is mentioned in the following description.

By virtue of the above characteristic structure of the first surface morphology of the dealkalized layer, the glass sheet having the first surface morphology can achieve a high transmittance. That is, in the production method of the present embodiment, the average value of transmittance gains for 400 to 800-nm wavelength visible light can be increased to 1.0% or more or even 1.5% or more in the resulting glass sheet by selecting an acid gas that allows the projections and depressions of the first surface morphology to be formed in the surface of the dealkalized layer. Here, the transmittance gains for 400 to 800-nm wavelength light described in the present specification are each a value obtained by subtracting a measured value of the transmittance of the glass sheet before dealkalization from a measured value of the transmittance of the glass sheet after dealkalization. In general, the transmittance gain is calculated for every 1-nm wavelength interval. The average value of transmittance gains is a value obtained by determining the values of transmittance gains at the corresponding wavelengths in the wavelength range (the wavelength range of 400 to 800 nm in the present embodiment) for which the average value is to be calculated, and then by performing simple averaging of the determined values.

Next, another surface morphology (second surface morphology) will be described. When the amount of water vapor contained in the acid gas is adjusted within such a range that the volume ratio of the water vapor to the acid in the acid gas is more than 0 and not more than 1.5, projections and depressions having a depth of 100 to 200 nm can be formed in the surface of the dealkalized layer so that an average value of porosities in a region in the thickness direction where the projections and depressions are formed is 30 to 50%. This can be seen as follows: since the amount of water vapor in the acid gas is relatively small, the progression of dehydration condensation is reduced, with the result that such projections and depressions are formed. Here, the porosities mean the proportions of voids at different levels in the thickness direction in a cross-section of the glass sheet taken along the thickness direction. Specifically, the porosities can be determined as follows. First, an image of a cross-section of the glass sheet in the thickness direction is scanned by a scanner, and the scanned image date is subjected to binarization. Then, the number of black pixels, i.e., pixels representing voids, in the binarized image data is counted. In this manner, the porosities can be calculated. The average value of porosities is a value obtained by dividing, by the projection-depression thickness, a value obtained by integrating the porosities over the surface region in the thickness direction of the glass sheet where the projections and depressions are formed. An example of the second surface morphology is a pattern in which repeating projections and depressions are formed in the surface of the glass sheet, the distance between a projection reference level and a depression reference level in the thickness direction of the glass sheet is 100 to 200 nm, and the change rate of the porosity in a region between the projection reference level and the depression reference level is −3.0 to 2.0%/nm over the region from the projection reference level to the depression reference level. The projection reference level is a level in the thickness direction at which the porosity is 80%, and the depression reference level is a level in the thickness direction at which the porosity is 20%. The projections and the depressions respectively project outwardly and are depressed inwardly in the thickness direction of the glass sheet. The projection reference level can be regarded as a reference level from which the depressions are depressed inwardly, while the depression reference level can be regarded as a reference level from which the projections project outwardly. In the case of the second surface morphology, the surface of the glass sheet is denser than in the case of the first surface morphology. This can be seen as a result of the dehydration condensation being promoted due to water vapor contained in the acid gas supplied for formation of the second surface morphology.

By virtue of the above characteristic structure of the second surface morphology of the dealkalized layer, the glass sheet having the second surface morphology can achieve a very high transmittance. That is, in the production method of the present embodiment, the average value of transmittance gains for 400 to 800-nm wavelength visible light can be increased to 2.5% or more or even 3.0% or more in the resulting glass sheet by selecting an acid gas that allows the projections and depressions of the second surface morphology to be formed in the surface of the dealkalized layer.

Next, still another surface morphology (third surface morphology) will be described. When the amount of water vapor contained in the acid gas is adjusted within such a range that the volume ratio of the water vapor to the acid is more than 1.5 and less than 8, projections and depressions having a depth of 20 to 100 nm can be formed in the surface of the dealkalized layer. This can be seen as follows: since the amount of water vapor in the acid gas is moderate, the above-mentioned dehydration condensation proceeds to a moderate degree, with the result that such projections and depressions are formed. In the case of the third surface morphology, the surface of the glass sheet is denser than in the cases of the first surface morphology and the second surface morphology. This can be seen as a result of the dehydration condensation being further promoted due to the larger amount of the water vapor contained in the acid gas.

By virtue of the above characteristic structure of the third surface morphology of the dealkalized layer, the glass sheet having the third surface morphology can achieve an increased transmittance. That is, in the production method of the present embodiment, the average value of transmittance gains for 400 to 800-nm wavelength visible light can be increased to 0.5% or more or even 1.0% or more in the resulting glass sheet by selecting an acid gas that allows the projections and depressions of the third surface morphology to be formed in the surface of the dealkalized layer. In addition, the mechanical strength properties, particularly abrasion resistance and weather resistance, can be improved compared to those of the glass sheets having the first surface morphology and the second surface morphology described above. This is because the further densification of the surface of the glass sheet increases the abrasion resistance of the surface and reduces elution of an alkali component in the glass sheet. Specifically, the amount of eluted sodium ions in the glass sheet as measured after the glass sheet is left in pure water kept at 95 degrees Celsius for 24 hours can be reduced to 0.3 to 0.4 microgram per unit surface area of the glass sheet.

Next, a fourth surface morphology will be described. In the case of using an acid gas containing a large amount of water vapor, such as an acid gas in which the volume ratio of the water vapor to the acid is 8 or more and 30 or less, a flat and smooth dealkalized layer can be formed, and a flat, smooth, and dense structure can be obtained in which the average value of porosities is 0 to 10% in a region of 20 to 100-nm thickness where the dealkalized layer is formed. Such a structure can be seen as a result of the progression of the above-described dehydration condensation being promoted sufficiently due to the amount of the water vapor that is sufficient with respect to the amount of the acid gas.

By virtue of the above characteristic structure of the fourth surface morphology of the dealkalized layer, the glass sheet having the fourth surface morphology can achieve an increased transmittance. That is, in the production method of the present embodiment, the average value of transmittance gains for 400 to 800-nm wavelength visible light can be increased to 0.1% or more in the resulting glass sheet by selecting an acid gas that allows the dense structure of the fourth surface morphology to be formed in the surface of the dealkalized layer. In addition, the mechanical strength properties, particularly abrasion resistance and weather resistance, can be further improved compared to those of the glass sheets having the first to third surface morphologies described above. This is because the formation of the dense structure in the surface of the glass sheet further increases the abrasion resistance of the surface and further reduces elution of an alkali component in the glass sheet. Specifically, the amount of eluted sodium ions in the glass sheet as measured after the glass sheet is left in pure water kept at 95 degrees Celsius for 24 hours can be reduced to 0.2 microgram or less per unit surface area of the glass sheet.

As described above, with the production method of the present embodiment, at least four types of glass sheets having different surface morphologies can be produced by changing the volume ratio of water vapor to the acid. These four types of glass sheets having different surface morphologies each have particular properties in terms of the transmittance, mechanical strength, elution of an alkali component, and the like. Therefore, these glass sheets can each be selectively used depending on the intended use. Examples of uses are described below. For cover glass for solar cells, there is not so strong a demand for increase in the mechanical strength since the cover glass is used outdoors and people thus have few opportunities to contact the cover glass. However, increase in transmittance is strongly demanded from the standpoint of increasing the efficiency of conversion of optical energy into electrical energy. For glass for indoor use, glass for automobiles, and the like, there is a strong demand for increase in both mechanical strength and transmittance since people have many opportunities to contact such glass. In glass that undergoes less elution of an alkali component, so-called weathering is less likely to occur. Such glass is suitable, for example, for glass products that are required to have high weather resistance, such as glass for ships, glass for shower booths, and mirrors for bathrooms. With the production method of the present embodiment, glass sheets appropriate for each of the various uses as mentioned above can be produced.

More specifically, with the production method of the present embodiment that uses an acid gas in which the volume ratio of water vapor to the acid is 0 or more and less than 8 (this method corresponds to any one of the methods for obtaining the first surface morphology to the third surface morphology described above), for example, a glass sheet for solar cells, a glass sheets for show windows, a low-friction glass sheet, a fingerprint-resistant glass sheet, and the like, can be produced.

For example, in the case of obtaining a glass sheet for solar cells or a glass sheet for show windows which is required to have high transmittance for sunlight, it is recommended that the glass sheet for solar cells or the glass sheet for show windows be a glass sheet produced by the production method of the present embodiment using an acid gas in which the volume ratio of water vapor to the acid is 0 or more and less than 8 so that projections and depressions are formed in a surface of the glass sheet and so that the average value of transmittance gains for 400 to 800-nm wavelength light is 1.0% or more. Producing a glass sheet so that the average value of transmittance gains for 400 to 800-nm wavelength light is 1.0% or more means, in other words, producing a glass sheet so that the transmittance for 400-nm to 800-nm wavelength light is 1.0% or more higher than that of a comparative glass sheet that has the same thickness and composition as the glass sheet and that does not have a projection-depression pattern in its principal surface.

In the case of obtaining a low-friction glass sheet or a fingerprint-resistant glass sheet, such as a glass substrate for touch panels, which is required to have low-friction properties or fingerprint resistance (the property that the amount of fingerprints to be left is small), it is recommended that the low-friction glass sheet or the fingerprint-resistant glass sheet be a glass sheet produced by the production method of the present embodiment using an acid gas in which the volume ratio of water vapor to the acid is 0 or more and less than 8 so that projections and depressions are formed in a surface of the glass sheet and so that the projections and depressions have a depth of 20 nm to 200 nm. Formation of the projections and depressions having such a depth in the surface allows reduction in the amounts of the friction generated, and the fingerprints left, on the surface of the glass sheet.

With the production method of the present embodiment that uses an acid gas in which the volume ratio of water vapor to the acid is 8 or more and 30 or less (this method corresponds to the method for obtaining the fourth surface morphology described above), for example, a glass sheet for chemical strengthening (a glass sheet to be subjected to chemical strengthening), a weather-resistant glass sheet, a glass sheet for functional coating formation (a glass sheet on a surface of which a functional coating is to be formed), a glass sheet for shower booths, a glass sheet for ships, and the like, can be produced.

For example, for a glass sheet for chemical strengthening, it is required that warping caused by chemical strengthening using alkali ion exchange be reduced. When an acid gas in which the volume ratio of water vapor to the acid is 8 or more and 30 or less is used in the production method of the present embodiment, the surface morphology of the resulting glass sheet is the fourth surface morphology described above. That is, a dealkalized layer having a dense structure is formed in a top surface of the glass sheet that is not in contact with the molten metal during the forming into the glass ribbon. Accordingly, alkali ion exchange in the top surface is restricted by the dealkalized layer during the chemical strengthening. This results in a reduction in the difference between the amount of alkali ion exchange in the top surface and the amount of alkali ion exchange in the bottom surface (the surface that is in contact with the molten metal during the forming into the glass ribbon) in which the alkali ion exchange during the chemical strengthening is restricted by entrance of the molten metal component. Consequently, occurrence of warping during the chemical strengthening is reduced.

In the case of obtaining a weather-resistant glass sheet, a glass sheet for shower booths, or a glass sheet for ships, which is required to be less prone to weathering, it is recommended that the glass sheet for such uses be a glass sheet produced by the production method of the present embodiment using an acid gas in which the volume ratio of water vapor to the acid is 8 or more and 30 or less so that a dense structure is formed in a surface of the glass sheet and so that the amount of alkaline elution is smaller than in a glass sheet that has the same thickness and composition and that does not have a surface having a dense structure formed therein. Such a glass sheet is suitable also as a glass sheet for functional coating formation.

As described thus far, with the production method of the present embodiment, at least one of the following glass sheets can be obtained depending on the volume ratio of water vapor to an acid (the volume of the water vapor/the volume of the acid) in an acid gas brought into contact with a surface of a glass ribbon on a molten metal:

a first glass sheet in which the transmittance gain for 400 to 800-nm wavelength visible light is 2.5% or more (a glass sheet having the second surface morphology);

a second glass sheet in which the transmittance gain for 400 to 800-nm wavelength visible light is 0.5% or more and in which the amount of eluted sodium ions as measured after the glass sheet is left in pure water kept at 95 degrees Celsius for 24 hours is 0.3 to 0.4 microgram per unit surface area of the glass sheet (a glass sheet having the third surface morphology); and a third glass sheet in which the amount of eluted sodium ions as measured after the glass sheet is left in pure water kept at 95 degrees Celsius for 24 hours is 0.2 microgram or less per unit surface area of the glass sheet (a glass sheet having the fourth surface morphology). These glass sheets are useful in that they can be selectively used depending on the above-mentioned uses.

In the production method of the present embodiment, as described above, the surface morphology of the resulting glass sheet is controlled in a simple way, i.e., by changing the amount of water vapor contained in the acid gas. The use of the coater 16 can be conceived as one means to supply the acid gas to the glass ribbon 10. Usually, the coater 16 needs to be washed each time a material put in the coater is changed, and this operation is very cumbersome. However, in the production method of the present embodiment, such washing is not required since it is only necessary to adjust the amount of water vapor in the acid gas.

Figure 2A:
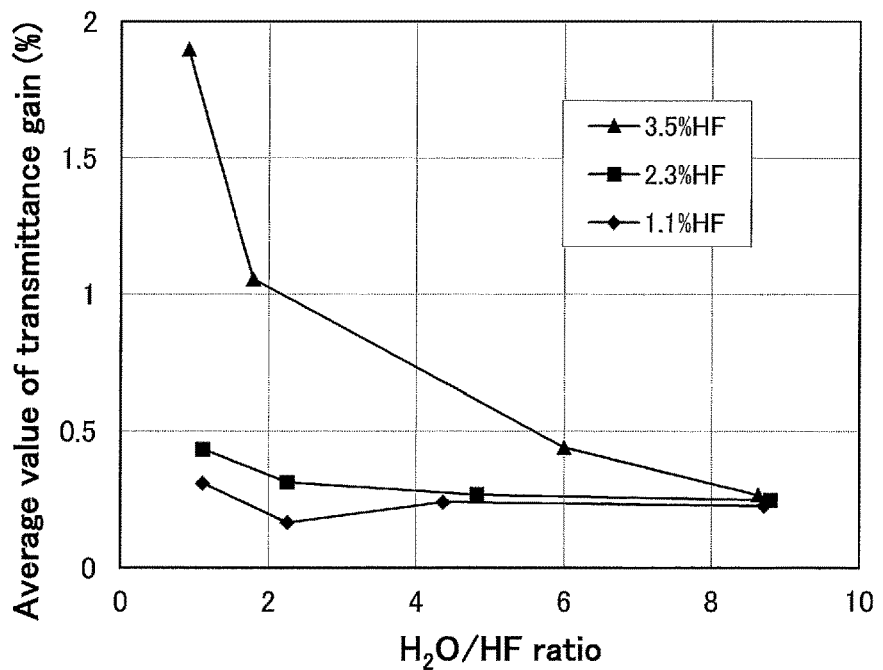
FIG. 2A is a graph showing the average value of transmittance gains of a glass sheet for 400 to 800-nm wavelength visible light with respect to the change in the amount of water vapor in an acid gas brought into contact with a surface of the glass sheet.
Figure 2B:
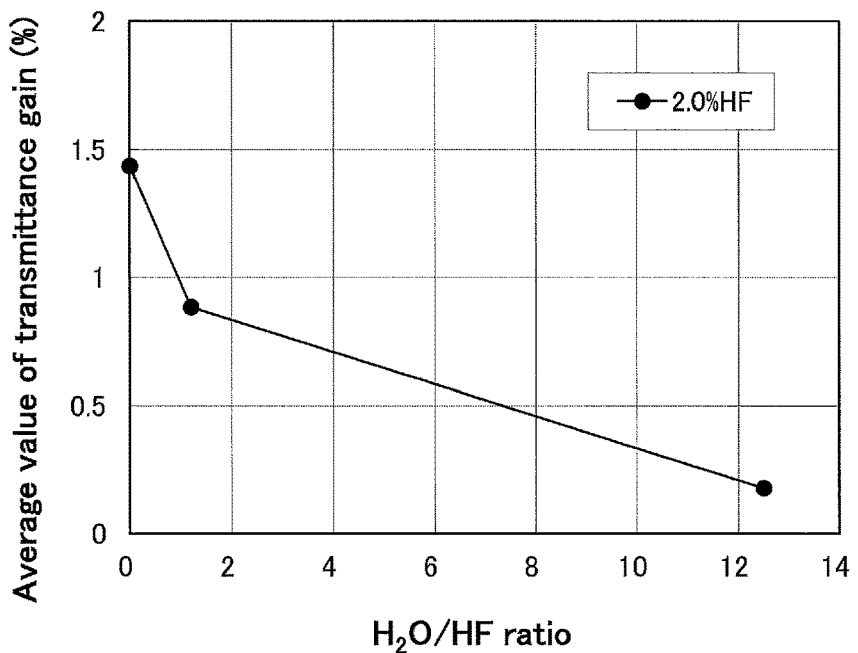
FIG. 2B is a graph showing the average value of transmittance gains of a glass sheet for 400 to 800-nm wavelength visible light with respect to the change in the amount of water vapor in an acid gas brought into contact with a surface of the glass sheet.

FIG. 2A is a graph showing the average value of transmittance gains of a glass sheet (composition of glass: 70.8 wt % of $SiO_2$, 1.0 wt % of $Al_2O_3$, 5.9 wt % of MgO, 8.5 wt % of CaO, and 13.2 wt % of $Na_2O$) for 400 to 800-nm wavelength visible light with respect to the change in the amount of water vapor contained in the acid gas. The horizontal axis represents the volume ratio of water vapor to an acid, and the vertical axis represents the average value of transmittance gains. These results are those obtained in the cases for which hydrogen fluoride is used as the acid contained in the acid gas, the treatment temperature is 660 degrees Celsius, the time of contact between the acid gas and the glass (treatment time) is 2 seconds, and the hydrogen fluoride concentration is varied (1.1 vol %, 2.3 vol %, and 3.5 vol %). In addition, FIG. 2B is a graph showing the average value of transmittance gains of a glass sheet (composition of glass: 70.8 wt % of $SiO_2$, 1.0 wt % of $Al_2O_3$, 5.9 wt % of MgO, 8.5 wt % of CaO, and 13.2 wt % of $Na_2O$) for 400 to 800-nm wavelength visible light with respect to the change in the amount of water vapor contained in the acid gas. The horizontal axis represents the volume ratio of water vapor to an acid, and the vertical axis represents the average value of transmittance gains. This result is that obtained in the case for which hydrogen fluoride is used as the acid contained in the acid gas, the treatment temperature is 640 degrees Celsius, the time of contact between the acid gas and the glass (treatment time) is 2.2 seconds, and the hydrogen fluoride concentration is 2.0 vol %.

FIG. 2A and FIG. 2B indicate that, when a glass sheet having a surface with projections and depressions is to be produced and the acid gas used contains hydrogen fluoride, the concentration of hydrogen fluoride in the acid gas is desirably 2.0 vol % or more. This is because changing the amount of water vapor contained in the acid gas makes it easy to control the transmittance gain, that is, to control the surface morphology of the glass sheet. The concentration of hydrogen fluoride in the acid gas is more desirably 3.5 to 10.0 vol %. This is because the control of the transmittance gain is made easier. In other words, adjusting the concentration of hydrogen fluoride within the above range makes it possible that the pattern of projections and depressions to be formed in the dealkalized layer is controlled to be a more desired pattern, thus making it easy to form a desired projection-depression pattern. On the other hand, in the case where the concentration of hydrogen fluoride in the acid gas is 1.1%, the amount of change in transmittance gain provided by changing the amount of water vapor contained in the acid gas is small.

The amount of change in transmittance gain in the case shown in FIG. 2A where the hydrogen fluoride concentration is 2.3 vol % is smaller than the amount of change in transmittance gain in the case shown in FIG. 2B where the hydrogen fluoride concentration is 2.0 vol %. This is thought to be because of the differences in treatment temperature and treatment time. The lower the hydrogen fluoride concentration is, the smaller the change in transmittance gain associated with the change in the volume ratio of water vapor to the acid is. However, as shown in FIG. 2A, even in the cases where the hydrogen fluoride concentration is 1.1 vol % and 2.0 vol %, the transmittance gain changes with the change in the volume ratio of water vapor to the acid, although the amount of change in transmittance gain is relatively small. As can be seen from this result, even when the hydrogen fluoride concentration is low, the surface morphology of the glass sheet can be controlled by changing the volume ratio of water vapor to the acid. In addition, even when the change in transmittance gain is small, other characteristics such as alkali passivation effect change with the change in the volume ratio of water vapor to the acid. Therefore, with the production method of the present embodiment, various characteristics other than the transmittance gain can also be changed by changing the volume ratio of water vapor to the acid. Consequently, surface morphologies having various characteristics can be achieved in the glass sheets to be produced.

Figure 3:
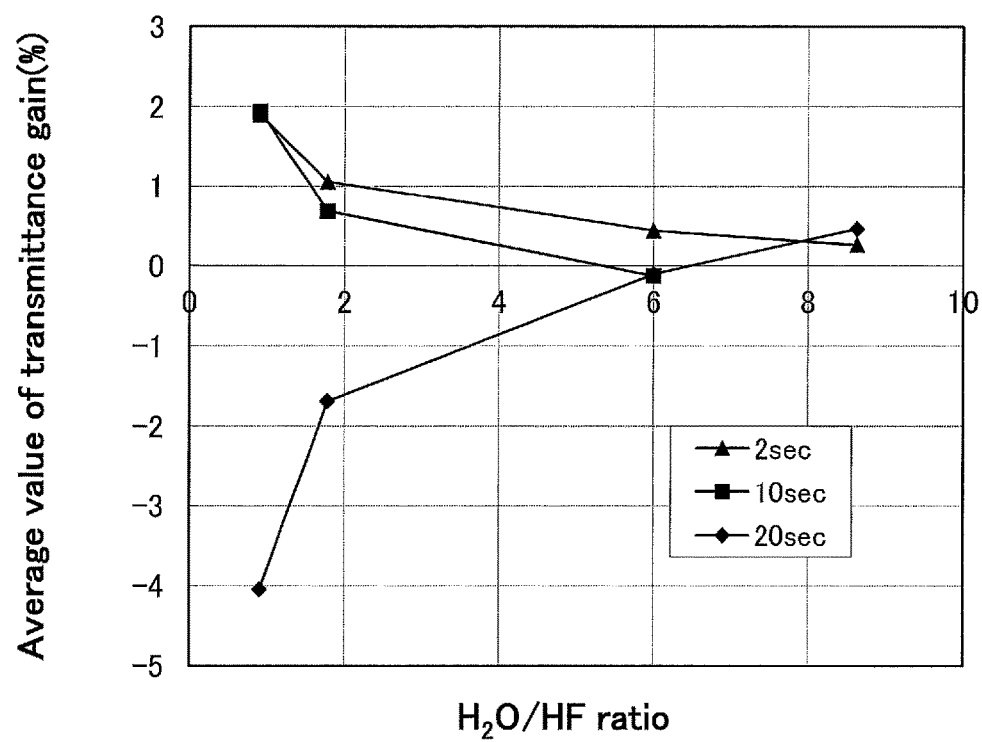
FIG. 3 is a graph showing the average value of transmittance gains of a glass sheet for 400 to 800-nm wavelength visible light with respect to the change in the amount of water vapor in an acid gas brought into contact with a surface of the glass sheet.

FIG. 3 is a graph showing the average value of transmittance gains of a glass sheet (composition of glass: 70.8 wt % of $SiO_2$, 1.0 wt % of $Al_2O_3$, 5.9 wt % of MgO, 8.5 wt % of CaO, and 13.2 wt % of $Na_2O$) for 400 to 800-nm wavelength visible light with respect to the change in the amount of water vapor contained in the acid gas. The horizontal axis represents the volume ratio of water vapor to the acid, and the vertical axis represents the average value of transmittance gains. These results are those obtained in the cases for which the treatment temperature is 660 degrees Celsius, the hydrogen fluoride concentration is 3.5 vol %, and the time of contact between the acid gas and the glass (treatment time) is varied (2 seconds, 10 seconds, and 20 seconds).

FIG. 3 indicates that the time of contact between the acid gas and the glass (treatment time) is desirably 2.0 to 10.0 seconds. Adjusting the treatment time within this range makes it possible that the surface morphology is controlled to be a more desired morphology, thus making it easy to form a desired surface morphology. In addition, the production method of the present embodiment is useful also in that the float bath 12 can be used by virtue of the fact that the surface morphology of the glass sheet can be modified in a short time as specified above. The treatment time falling outside the above range is not preferable, since a transmittance gain cannot be obtained even by changing the amount of water vapor contained in the acid gas.

Figure 4:
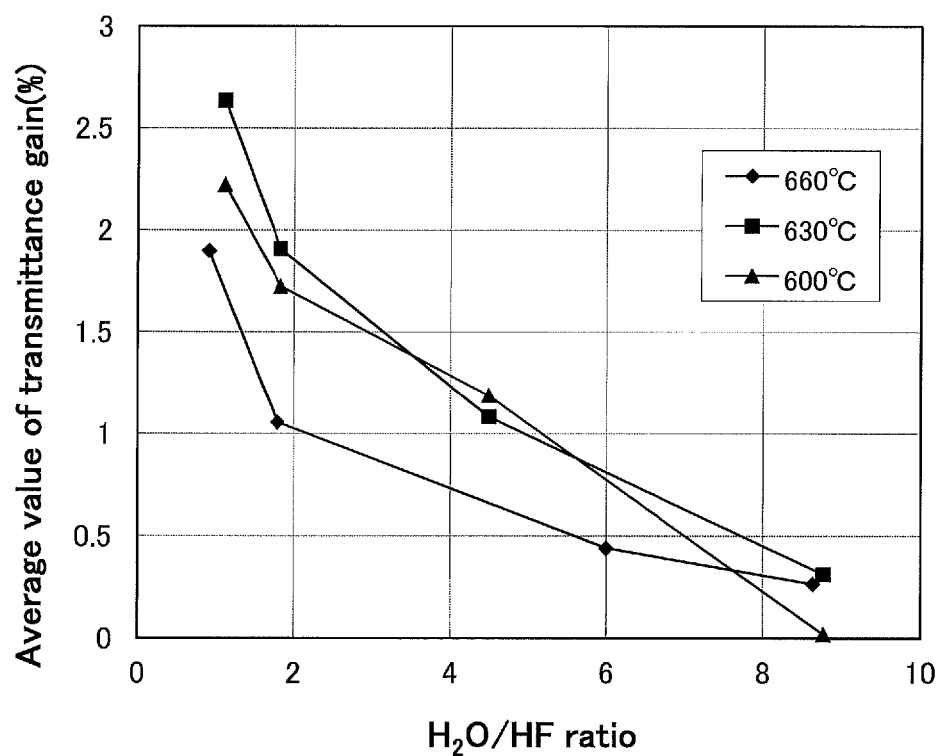
FIG. 4 is a graph showing the average value of transmittance gains of a glass sheet for 400 to 800-nm wavelength visible light with respect to the change in the amount of water vapor in an acid gas brought into contact with a surface of the glass sheet.

FIG. 4 is a graph showing the average value of transmittance gains of a glass sheet (composition of glass: 70.8 wt % of $SiO_2$, 1.0 wt % of $Al_2O_3$, 5.9 wt % of MgO, 8.5 wt % of CaO, and 13.2 wt % of $Na_2O$) for 400 to 800-nm wavelength visible light with respect to the change in the amount of water vapor contained in the acid gas. The horizontal axis represents the volume ratio of water vapor to the acid, and the vertical axis represents the average value of transmittance gains. These results are those obtained in the cases for which the time of contact between the acid gas and the glass (treatment time) is 2 seconds, the hydrogen fluoride concentration is 3.4 to 3.5 vol %, and the treatment temperature is varied (600 degrees Celsius, 630 degrees Celsius, and 660 degrees Celsius).

It can be understood from FIG. 4 that the change in the treatment temperature from 600 degrees Celsius to 660 degrees Celsius has a small influence on the change in the average value of transmittance gains versus the volume ratio of water vapor to the acid. This suggests that the treatment temperature is desirably 580 to 740 degrees Celsius, and more desirably 600 to 680 degrees Celsius. Adjusting the treatment temperature within these ranges makes it possible that the surface morphology is controlled to be a more desired morphology, thus making it easy to form a desired surface morphology. In addition, the production method of the present embodiment is useful also in that the float bath 12 can be used by virtue of the fact that the surface morphology of the glass sheet can be modified at the above temperatures. Although the glass temperature is different between the upstream side and the downstream side, the temperature of the float bath 12 is usually 600 to 1000 degrees Celsius. Therefore, the acid gas may be supplied to the glass in the float bath 12 where the glass temperature can reach a temperature at which surface modification is possible. The fact that the float bath 12 can be used is useful in that the need for reheating of the glass sheet that has been cooled once is eliminated. The temperature of the acid gas supplied to the glass sheet is not particularly limited, and may be equal to or higher than the boiling point of the acid gas.

The acid gas is desirably recovered after dealkalization, regardless of whether the acid gas does or does not contain water vapor. That is, it is desirable that a step (step (III)) of recovering the acid gas be further carried out after the step (II). In this case, the acid gas may be recovered using the coater that supplies the acid gas. Alternatively, at least one of the coaters 16a to 16c may be used to recover the acid gas.

When the acid gas is supplied to the molten tin 15, there may arise a problem of the molten tin 15 in the float bath 12 being oxidized by reaction with the acid gas. Recovering the acid gas allows prevention of the occurrence of such a problem.

As described above, the method of the present embodiment for producing glass sheets can be carried out using a conventional production line of glass sheets, in addition to which cumbersome operations, such as cleaning of the equipment of the production line and change of materials to be used, are not required. Therefore, the method of the present embodiment for producing glass sheets does not cause a significant reduction in production efficiency or a significant increase in production cost.

The glass sheet may be glass that can be produced by a float process. For example, common soda-lime glass can be used, and its composition is not particularly limited. The thickness of the glass sheet is not particularly limited, and can be, for example, 0.33 to 10.0 mm.

EXAMPLES

Hereinafter, the present invention will be described in more detail using examples. However, the present invention is not limited to the examples given below, and other examples are possible as long as they do not depart from the gist of the present invention.

Examples 1 to 3

Method for Producing Glass Sheet

Soda-lime glass sheets were produced by a float process. For the production of the glass sheets, a system having the same configuration as the system shown in FIG. 1 was used. First, a glass raw material was prepared so as to have the following main composition of glass: 70.8 wt % of $SiO_2$, 1.0 wt % of $Al_2O_3$, 5.9 wt % of MgO, 8.5 wt % of CaO, and 13.2 wt % of $Na_2O$. The glass raw material was melted, the glass raw material melted was formed into a glass ribbon on molten tin in the float bath, and dealkalization was carried out by supplying an acid gas containing hydrogen fluoride and water vapor to a surface of the glass ribbon using a coater. In addition, the acid gas supplied was recovered using a coater. The acid concentration (hydrogen fluoride concentration) in the acid gas and the volume ratio of the water vapor to the acid are shown in Table 1. In the present examples, for the acid gas supplied to the surface of the glass ribbon, the volume ratio of the water vapor to the acid and the acid concentration were controlled by commercially-available volume flow meters (not shown) attached respectively to supply sources of hydrogen fluoride, water vapor, and nitrogen gas. The treatment time and the treatment temperature are also shown in Table 1. In addition, the thicknesses of the glass sheets obtained are also shown in Table 1.

Examples 4 to 6

Glass sheets were fabricated by the same procedures as in Examples 1 to 3, except that water vapor was not contained in the acid gas blown onto the surface of the glass ribbon for dealkalization, and that the concentration of the acid (concentration of hydrogen fluoride) contained in the gas, the treatment time, and the treatment temperature were varied. The acid concentration in the acid gas, the treatment time, and the treatment temperature which were employed in Examples 4 to 6 are shown in Table 1.

Examples 7 to 11

Glass sheets were fabricated by the same procedures as in Examples 1 to 3, except that the acid concentration (hydrogen fluoride concentration) in the acid gas, the volume ratio of water vapor to the acid, and the treatment time and the treatment temperature in the dealkalization were varied. The acid concentration in the acid gas, the treatment time, and the treatment temperature which were employed in Examples 7 to 11 are shown in Table 1.

Examples 12 and 13

Method for Producing Glass Sheet

Glass sheets having a thickness of 1.1 mm were produced by a float process. First, a glass raw material was prepared so as to have the following composition of glass: 70.8% of $SiO_2$, 1.0% of $Al_2O_3$, 8.5% of CaO, 5.9% of MgO, 13.2% of $Na_2O$, and 0.6% of $K_2O$, where "%" means "weight %". This glass raw material was melted, and the glass raw material melted was formed into a 1-mm thick sheet-shaped glass ribbon on molten tin in the float bath. In addition, using a gas supply device provided in the float bath, an acid gas containing hydrogen fluoride and water vapor was supplied together with nitrogen as a carrier gas to a surface of the glass ribbon having a temperature of 660 degrees Celsius, whereby a dealkalized layer densified by dehydration condensation was formed in the top surface of the glass ribbon. The time of contact of the acid gas with the glass surface was 2.4 seconds. The acid concentration (hydrogen fluoride concentration) in the acid gas, the concentration of the water vapor, and the volume ratio of the water vapor to the acid, were as shown in Table 3. Thereafter, dealkalization was performed by blowing $SO_2$ gas onto the bottom surface of the glass sheet in the annealing furnace, and thus a protective coating was formed.

Comparative Example 1

A glass sheet was produced in the same manner as in Example 10 except that an acid gas was not supplied to a surface of the glass ribbon.

Comparative Example 2

A glass sheet was produced in the same manner as in Example 11 except that an acid gas was not supplied to a surface of the glass ribbon.

Comparative Example 3

A glass sheet was produced in the same manner as in Examples 12 and 13 except that an acid gas was not supplied to a surface of the glass ribbon.

Hereinafter, evaluation items will be described.

[SEM Observation]

For the glass sheets obtained in Examples 1 to 11, the surface of the dealkalized layer was observed by a SEM. FIGS. 5 to 15 are respectively SEM photographs of the glass sheets of Examples 1 to 11.

[Transmittance Gain]

For Examples 1 to 13, the average value of transmittance gains for 400 to 800-nm wavelength visible light was determined. The results are shown in Table 1. The method employed is as follows. First, in order to determine transmittance gains, the transmittance of the glass sheet before dealkalization and the transmittance of the glass sheet after dealkalization were each measured in the wavelength range of 400 to 800 nm for every 1-nm wavelength interval using a spectrophotometer, U4100 manufactured by Hitachi High-Technologies Corporation. For each measurement wavelength, a transmittance gain was calculated by subtracting the transmittance of the glass sheet before dealkalization from the transmittance of the glass sheet after dealkalization. This was followed by simple averaging of the transmittance gains in the wavelength range of 400 to 800 nm to determine the average value of the transmittance gains.

[Mechanical Strength]

For Examples 2, 5, 6, 7, and 9 to 13, the abrasion resistance, which is one of the mechanical strength properties, was examined. The abrasion resistance was evaluated by a difference value between the average values of transmittance gains for Illuminant C before and after an abrasion test. The abrasion test was carried out as follows. First, a 4-$cm^2$ flannel cloth was placed in contact with a surface of the glass sheet. Next, a load of 125 g was applied to the glass sheet via the flannel cloth, and the flannel cloth was moved back and forth 5000 times at a speed of 7200 mm/minute. For the abrasion test, an abrasion tester ("HEIDON-18" manufactured by SHINTO Scientific Co., ltd.) was used. The measurement of the average value of C-light transmittance gains was performed with a haze meter ("NDH-2000" manufactured by NIPPON DENSHOKU INDUSTRIES CO., LTD.) by measuring the transmittances for all of light emitted from Illuminant C and calculating an average value of the transmittances. The results are shown in Table 1.

[Test for Elution Amount]

For Examples 2, 4, 5, 6, 7, 9, 10, and 11 and Comparative Examples 1 and 2, the amount of eluted sodium ions after a hot-water test was examined. The method employed was as follows. Into a Teflon container having a 60-nm diameter opening, 30 ml of pure water was poured. An O-ring made of silicon was placed on the opening of the container, and the glass sheet washed with pure water was placed on the O-ring so that the container and the glass sheet were in close contact with each other. Next, the container and the glass sheet were inverted 180 degrees to bring the glass sheet into contact with the pure water. The inverted state was maintained for 24 hours with the pure water kept at 95 degrees Celsius. Thereafter, the amount of sodium ions eluted from the surface of the glass sheet into the pure water was measured. For the measurement, a plasma emission spectrometer ("SPS 3520UV" manufactured by SII NanoTechnology Inc.) was used. The amount of sodium ions eluted per unit surface area of the glass sheet that was in close contact with the pure water is shown in Table 1.

[Measurement on Projections and Depressions in Surface]

For the glass sheets of Examples 2 and 6 to 11, a surface roughness (Ra), a maximum height difference (P-V) (corresponding to the depth of projections and depressions), and a S-ratio (a value obtained by dividing an area including the areas of projections and depressions by an observation area), were determined by performing observations using a scanning probe microscope (SPA-400 manufactured by SII NanoTechnology Inc. (current name: Hitachi High-Tech Science Corporation)) in a DFM mode where the observation region was set to 2-micrometer squares and the number of data acquired was set to 512×512. The values of the roughness parameters were calculated based on the 2001-version of JIS standards (JIS B 0601:2001) and the 1997- version of ISO standards (ISO 4287:1997) using a software employing an analysis scheme in which parameters are extended to three-dimensions. The measurement of Ra, P-V, and S-ratio was carried out for the glass sheets of Examples 2 and 6 to 11. For the glass sheets of Examples 1 and 3 to 5, the measurement of Ra, P-V, and S-ratio was not carried out. Instead, the distance in the thickness direction of the glass sheet between the highest projection point (the projection that is most protruding in the thickness direction of the glass sheet) and the deepest depression point (the depression that is most depressed in the thickness direction of the glass sheet) which were observed in a SEM photograph of a cross-section taken along the thickness direction of the glass sheet was measured as the depth of projections and depressions. The distances were respectively about 200 nm, about 140 nm, about 50 nm, and about 60 nm in Example 1, Example 3, Example 4, and Example 5.

[Average Value of Porosities]

SEM photographs of cross-sections taken along the thickness direction of the glass sheets obtained in Examples 1 to 13 were scanned by a scanner, and the data obtained by the scanning were subjected to binarization. Photoshop (CS6) manufactured by Adobe Systems Incorporated was used as the scanner. Next, using the binarized data, porosities at different levels in the thickness direction were determined with respect to the distance (depth) from the outermost surface (highest projection point) of the glass sheet in the thickness direction of the glass sheet. The values of the porosities at the different depths were integrated, and the resulting value was divided by the depth of the projections and depressions formed in the surface of the glass sheet, and the thus-calculated value was determined as the average value of porosities. The results are shown in Table 1.

[Weathering Test]

The glass sheets of Examples 10 and 11 and the glass sheets of Comparative Examples 1 to 2 were each washed with pure water, and held in a constant temperature and humidity chamber having a temperature of 60 degrees Celsius and a humidity of 100%. The glass sheet was taken out at arbitrary times, and was observed under fluorescent light. The number of days elapsed until weathering was observed in the evaluated surface was evaluated as weathering occurrence day. The results are shown in Table 2.

[Chemical Strengthening Method]

A sample having a size of 370 mm×470 mm was cut out from each of the glass sheets of Examples 12 and 13 and the glass sheet of Comparative Example 3, and the sample was subjected to chemical strengthening. First, the sample was washed, and then immersed in a molten salt of $KNO_3$. The temperature of the molten salt of $KNO_3$ was set to 460 degrees Celsius, and the immersion time was set to 2.5 hours. The sample was taken out from the molten salt of $KNO_3$ and then cooled, followed by washing to remove $KNO_3$ attached to the sample.

[Measurement Method of Amount of Warping]

For the glass sheets of Examples 12 and 13 and the glass sheet of Comparative Example 3, the amount of warping in the chemical strengthening was measured. The amount of warping of each glass sheet was measured both before and after the chemical strengthening. The sample glass sheet was placed on a flat surface plate in such a manner that the top surface faced downward and the bottom surface faced upward, and the distances between the sample and the surface plate were measured using a gap gauge at eight points, i.e., at the four corners and the centers of the four sides of the sample. The maximum value was used as the amount of warping in the sample. The values of the maximum amount of warping were measured for 18 samples, and the average value was determined. The results are shown in Table 3.

TABLE 1

| | Acid concentration (HF concentration) [vol. %] | Volume ratio of water vapor to acid | Treatment time [Seconds] | Treatment temperature [° C.] | Transmittance gain (400 to 800-nm visible light) [%] | Abrasion test (Difference value between transmittance gains for Illuminant C before and after test) [%] |
|---|---|---|---|---|---|---|
| Example 1 | 4.0 | 0.9 | 6.0 | 660 | 2.9 | — |
| Example 2 | 5.0 | 0.9 | 6.0 | 630 | 3.2 | −0.7 |
| Example 3 | 4.0 | 0.9 | 6.0 | 590 | 3.2 | — |
| Example 4 | 2.0 | 0 | 2.2 | 640 | 1.4 | — |
| Example 5 | 10.5 | 0 | 1.8 | 680 | 1.3 | −1.1 |
| Example 6 | 19.0 | 0 | 2.2 | 630 | 2.0 | −0.3 |
| Example 7 | 17.0 | 2.0 | 2.2 | 630 | 1.2 | 0.0 |
| Example 8 | 3.4 | 6.0 | 2.0 | 660 | 0.5 | — |
| Example 9 | 8.0 | 8.0 | 1.8 | 680 | 0.1 | 0.0 |
| Example 10 | 2.0 | 12.5 | 2.2 | 640 | 0.2 | 0.0 |
| Example 11 | 3.0 | 21.6 | 3.1 | 680 | 0.2 | 0.0 |
| Example 12 | 2.5 | 20 | 2.5 | 660 | 0.2 | 0.0 |
| Example 13 | 1.0 | 20 | 2.5 | 660 | 0.1 | 0.0 |

Figure 5:
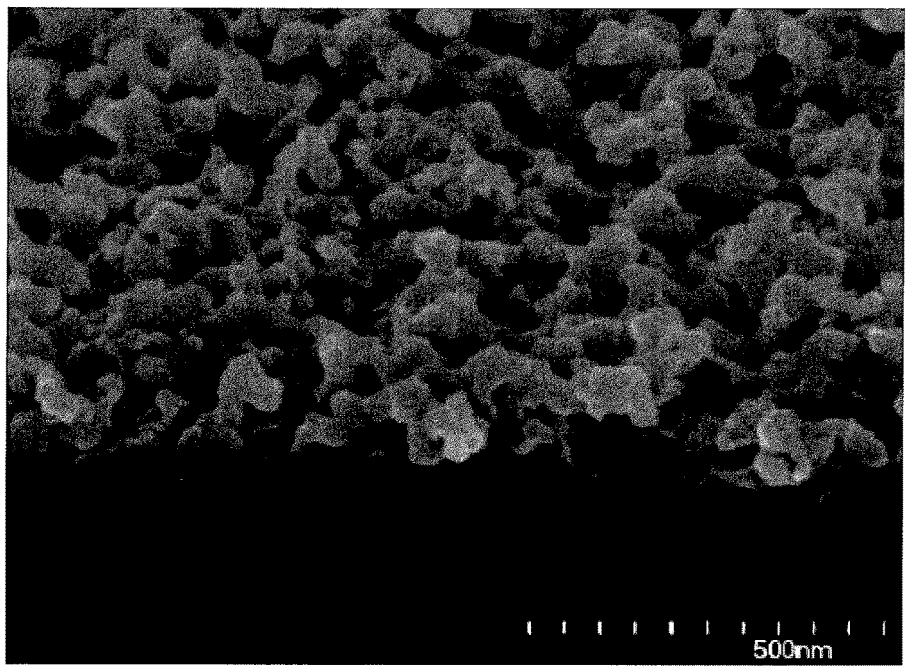
FIG. 5 is a scanning electron microscope (SEM) photograph of a surface of a dealkalized layer of a glass sheet of Example 1.
Figure 6:
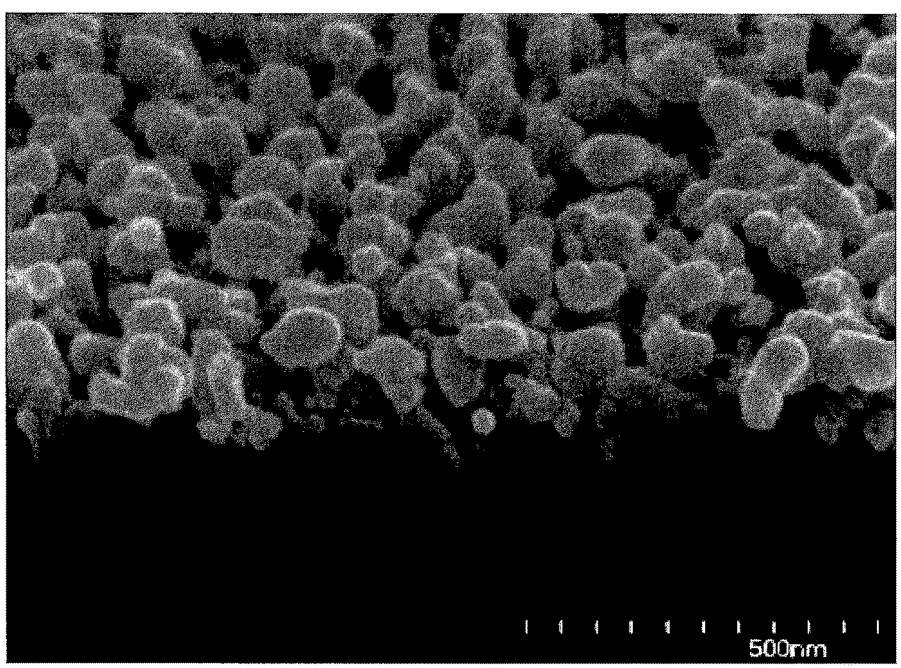
FIG. 6 is a SEM photograph of a surface of a dealkalized layer of a glass sheet of Example 2.
Figure 7:
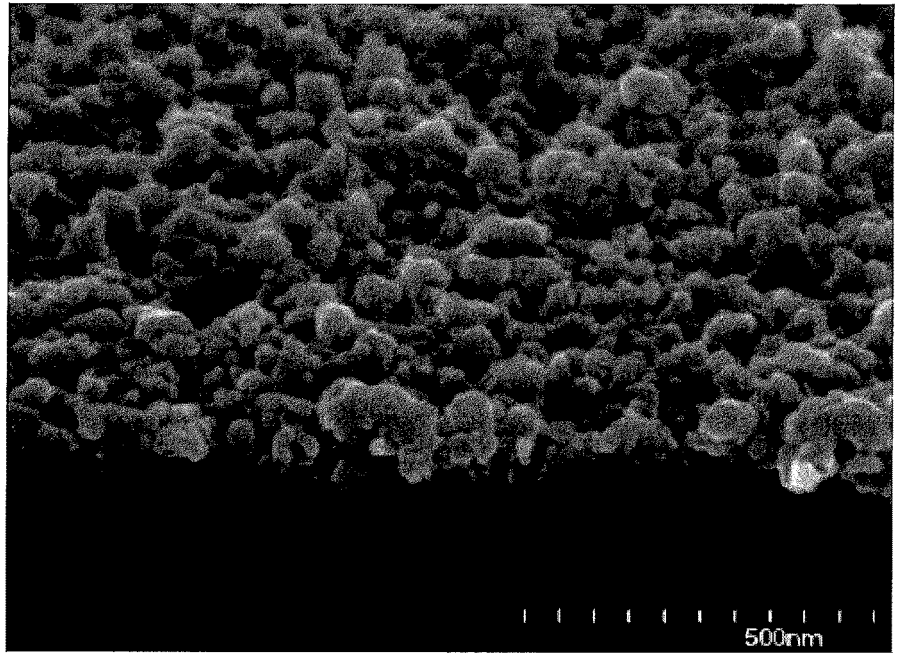
FIG. 7 is a SEM photograph of a surface of a dealkalized layer of a glass sheet of Example 3.
Figure 8:
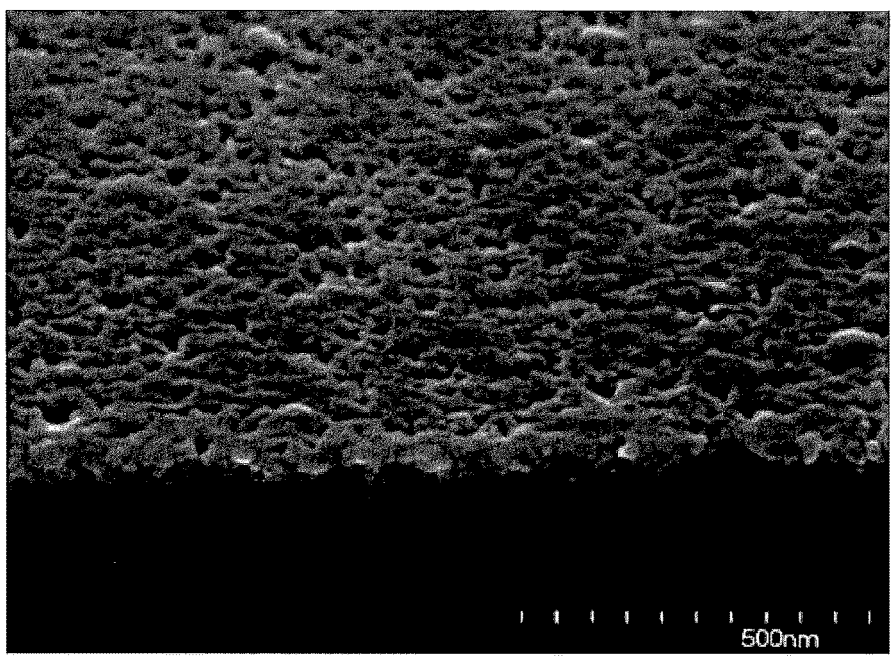
FIG. 8 is a SEM photograph of a surface of a dealkalized layer of a glass sheet of Example 4.
Figure 9:
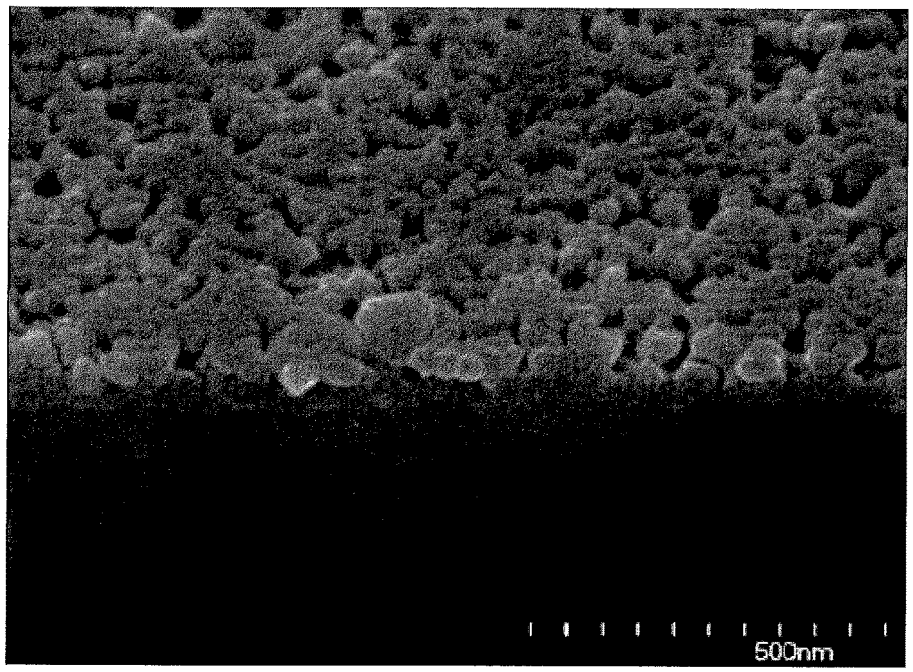
FIG. 9 is a SEM photograph of a surface of a dealkalized layer of a glass sheet of Example 5.
Figure 10:
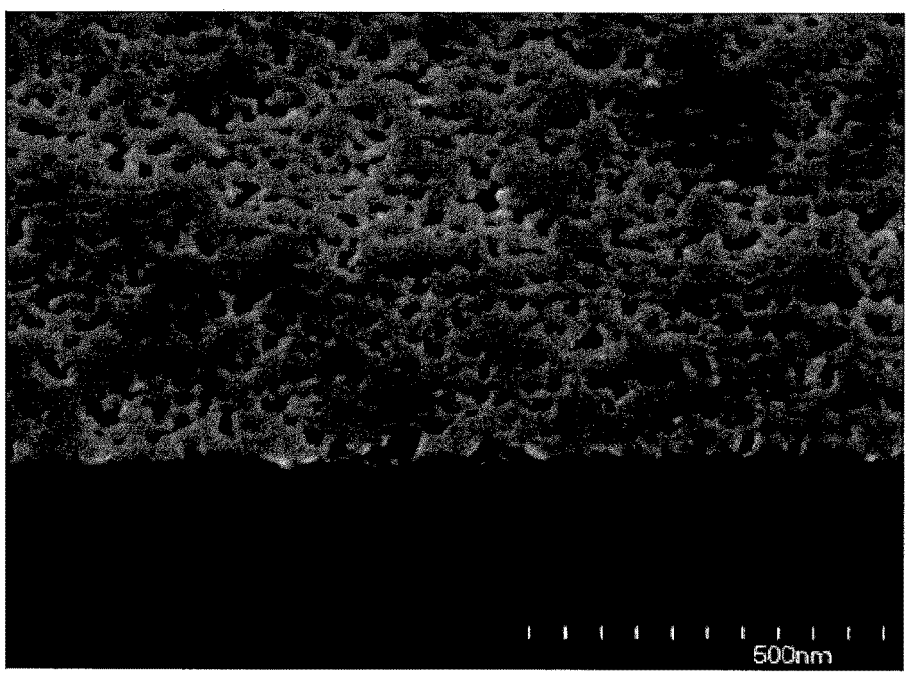
FIG. 10 is a SEM photograph of a surface of a dealkalized layer of a glass sheet of Example 6.

| | Test for elution amount (Amount of eluted sodium ions) [μg/cm²] | Glass thickness [mm] | SEM photograph | Porosity of dealkalized layer [%] | Measurement on projections and depressions in surface | | |
|---|---|---|---|---|---|---|---|
| | | | | | Ra (nm) | P-V (nm) | S-ratio |
| Example 1 | — | 3 | FIG. 5 | 41 | — | — | — |
| Example 2 | 3.0 | 3 | FIG. 6 | 41 | 10.7 | 126.9 | 1.21 |
| Example 3 | — | 3 | FIG. 7 | 43 | — | — | — |
| Example 4 | 1.6 | 3 | FIG. 8 | — | — | — | — |
| Example 5 | 0.2 | 3 | FIG. 9 | 17 | — | — | — |
| Example 6 | 0.6 | 3 | FIG. 10 | — | 4.5 | 60.6 | 1.22 |

TABLE 1-continued

Figure 11:
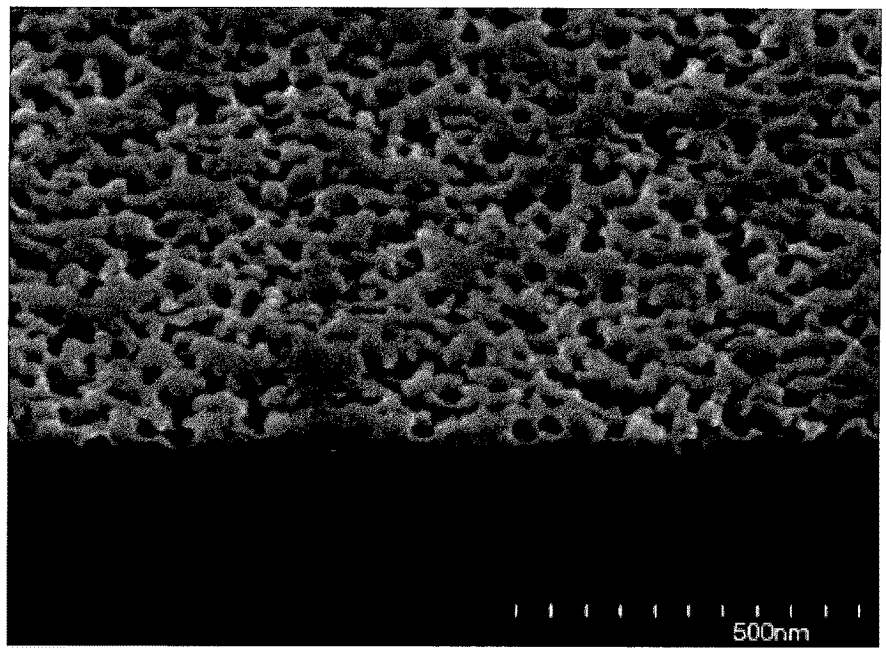
FIG. 11 is a SEM photograph of a surface of a dealkalized layer of a glass sheet of Example 7.
Figure 12:
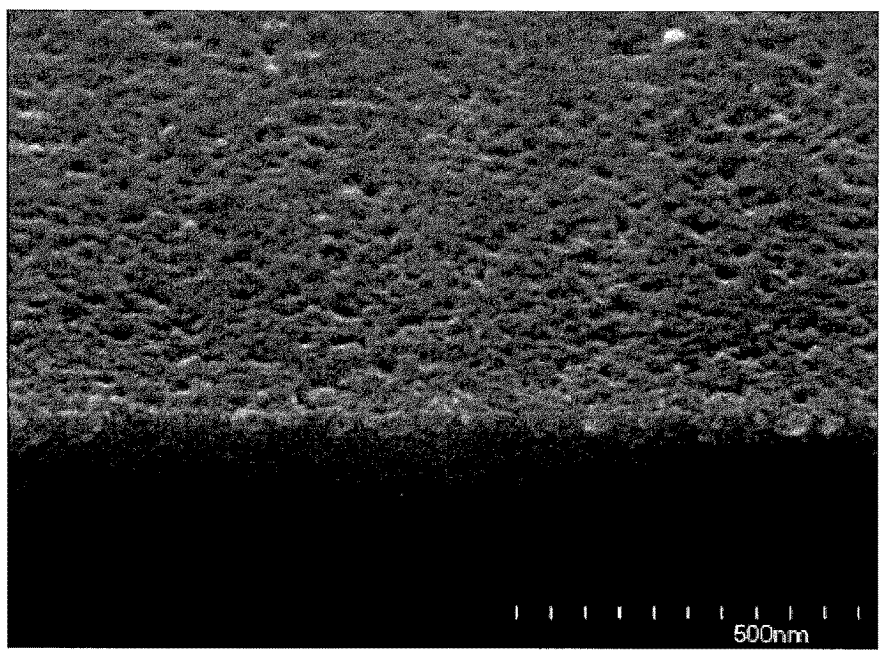
FIG. 12 is a SEM photograph of a surface of a dealkalized layer of a glass sheet of Example 8.
Figure 13:
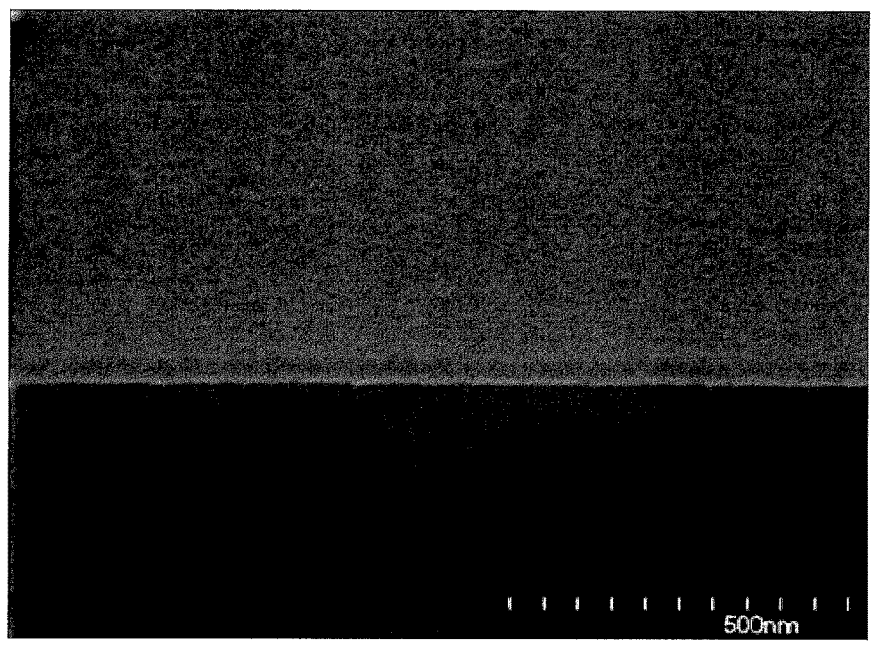
FIG. 13 is a SEM photograph of a surface of a dealkalized layer of a glass sheet of Example 9.
Figure 14:
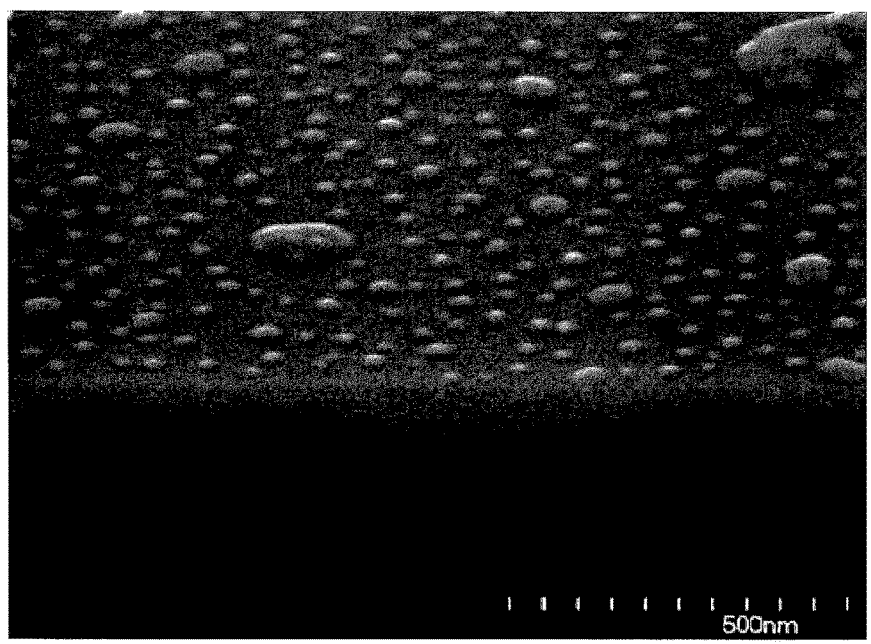
FIG. 14 is a SEM photograph of a surface of a dealkalized layer of a glass sheet of Example 10.
Figure 15:
FIG. 15 is a SEM photograph of a surface of a dealkalized layer of a glass sheet of Example 11.

| | | | | | | | |
|---|---|---|---|---|---|---|---|
| Example 7 | 0.3 | 3 | FIG. 11 | 43 | 5.6 | 62.1 | 1.26 |
| Example 8 | — | 4 | FIG. 12 | — | 1.4 | 60.8 | 1.03 |
| Example 9 | <0.1 | 3 | FIG. 13 | 0 | 0.4 | 6.3 | 1.01 |
| Example 10 | 0.2 | 3 | FIG. 14 | 0 | 0.3 | 7.9 | 1.00 |
| Example 11 | <0.1 | 4 | FIG. 15 | 0 | 0.2 | 2.1 | 1.00 |
| Example 12 | — | 1.1 | — | 0 | — | — | — |
| Example 13 | — | 1.1 | — | 0 | — | — | — |

TABLE 2

| | Test for elution amount (Amount of eluted sodium ions) [μg/cm$^2$] | Weathering occurrence day [days] |
|---|---|---|
| Example 10 | 0.2 | 46 |
| Example 11 | <0.1 | >90 |
| Comparative Example 1 | 1.2 | 3 |
| Comparative Example 2 | 0.5 | 3 |

TABLE 3

| | Amount of warping after chemical strengthening (mm) | Amount of warping before chemical strengthening (mm) |
|---|---|---|
| Example 12 | 0.25 | 0.10 |
| Example 13 | 0.43 | 0.10 |
| Comparative Example 3 | 0.50 | 0.10 |

As shown in the SEM photographs of FIG. 5 to FIG. 15, the surface morphologies of the glass sheets were able to be controlled into various morphologies by using acid gases containing different amounts of water vapor. In the glass sheets of Examples 1 to 3 for which the volume ratio of water vapor to the acid in the acid gas was more than 0 and not more than 1.5, projections and depressions having a depth within the range of 100 to 200 nm were formed in a surface of the glass sheet, and the transmittance gain was more than 2.5%. In the glass sheets of Examples 9 to 11 for which an acid gas containing a relatively large amount of water vapor was used, a surface of the glass sheet had a flat, smooth, and dense structure.

In the glass sheets of Examples 2, 5, and 6 for which the volume ratio of water vapor to the acid in the acid gas was not more than 1.5, a decrease in the average value of transmittance gains was observed after the abrasion test. On the other hand, in the glass sheets of Examples 7, 9, and 10 for which the volume ratio was more than 1.5, no decrease in the average value of transmittance gains was observed even after the abrasion test was performed.

Furthermore, in the glass sheet of Example 2 for which the volume ratio of water vapor to the acid in the acid gas was more than 0 and not more than 1.5, the amount of eluted sodium ions was 3.0 microgram/cm$^2$, while in the glass sheets of Examples 4, 5, and 6 for which an acid gas containing no water vapor was used, the amount of eluted sodium ions was 0.2 to 1.6 microgram/cm$^2$. In the glass sheet of Example 7 for which the volume ratio of water vapor to the acid in the acid gas was more than 1.5 and less than 8, the amount of eluted sodium ions was 0.3 microgram/cm$^2$, while in the glass sheets of Examples 9 and 11 for which the volume ratio of water vapor to the acid in the acid gas was not less than 8, the amount of eluted sodium ions was not more than 0.1 microgram/cm$^2$; that is, the elusion of sodium ions was hardly detected.

As shown in Table 2, in the glass sheets of Examples 10 and 11, the number of days elapsed until the occurrence of weathering was larger than in the glass sheets of Comparative Examples 1 and 2 for which surface treatment with an acid gas was not performed. Such glass sheets as Examples 10 and 11 are those produced when an acid gas in which the volume ratio of water vapor to the acid is 8 or more and 30 or less is used in the production method of the present invention, and the glass sheets are less prone to weathering since the amount of alkaline elusion is smaller than in a glass sheet that has the same thickness and composition and that does not have a surface having a dense structure formed therein. Therefore, such glass sheets can be suitably used as weather-resistant glass sheets, glass sheets for ships, and glass sheets for shower booths.

As shown in Table 3, the amount of warping after chemical strengthening in the glass sheets of Examples 12 and 13 was smaller than in the glass sheet of Comparative Example 3 for which surface treatment with an acid gas was not performed, despite the fact that the amount of warping before chemical strengthening was the same among Examples 12 and 13 and Comparative Example 3. Such glass sheets as Examples 12 and 13 are those produced when an acid gas in which the volume ratio of water vapor to the acid is 8 or more and 30 or less is used in the production method of the present invention, and warping after chemical strengthening can be reduced by formation of a dealkalized layer having a dense structure. Therefore, such glass sheets can be suitably used as glass sheets for chemical strengthening.

As described above, with the production method of the present invention, glass sheets having various surface morphologies can be produced. In addition, since the various surface morphologies of glass sheets each exhibit particular properties, the resulting glass sheets having various surface morphologies can be selectively used depending on the intended use.

INDUSTRIAL APPLICABILITY

The method of the present invention for producing glass sheets is capable of producing glass sheets having various surface morphologies, and is thus useful as a method for producing glass sheets for various uses.

The invention claimed is:
1. A method for producing glass sheets, comprising steps of:
   (I) forming a molten glass raw material into a glass ribbon on a molten metal; and
   (II) bringing an acid gas, in which a volume ratio of water vapor to an acid (a volume of the water vapor/a volume of the acid) is 12.5 or more and 30 or less, into contact with a surface of the glass ribbon on the molten metal at a temperature of 580° C. or more so as to subject the surface of the glass ribbon to dealkalization and control a morphology of the surface in accordance with the volume ratio, wherein the acid is a fluorine element (F)-containing acid.

2. The method for producing glass sheets according to claim 1, further comprising a step of (III) recovering the acid gas after the step (II).

\* \* \* \* \*